United States Patent [19]

Nakayama et al.

[11] Patent Number: 5,359,666
[45] Date of Patent: Oct. 25, 1994

[54] DRIVING WAY JUDGING DEVICE AND METHOD

[75] Inventors: Shigeto Nakayama, Tokyo; Hiroshi Hasegawa, Saitama, both of Japan

[73] Assignee: Honda Giken Kogyo Kabushiki Kaisha, Tokyo, Japan

[21] Appl. No.: 32,409

[22] Filed: Mar. 15, 1993

Related U.S. Application Data

[63] Continuation of Ser. No. 912,070, Jul. 8, 1992, abandoned, which is a continuation of Ser. No. 413,835, Sep. 28, 1989, abandoned.

[30] Foreign Application Priority Data

Sep. 28, 1988 [JP] Japan .................. 63-243329
Sep. 28, 1988 [JP] Japan .................. 63-243330
Sep. 28, 1988 [JP] Japan .................. 63-243331

[51] Int. Cl.$^5$ .................. G06K 9/00; G06K 9/48; G06F 7/70
[52] U.S. Cl. .................. 382/1; 382/22; 364/424.02; 348/119
[58] Field of Search .................. 382/1, 22, 48; 901/47; 348/118, 119; 364/424.02

[56] References Cited

U.S. PATENT DOCUMENTS

| | | | |
|---|---|---|---|
| 4,855,822 | 8/1989 | Narendra et al. | 901/47 |
| 4,868,572 | 9/1989 | Fujii et al. | 358/103 |
| 4,970,653 | 11/1990 | Kenue | 364/461 |
| 5,097,239 | 3/1992 | Hasegawa et al. | 382/8 |
| 5,122,957 | 6/1992 | Hattori | 364/424.02 |
| 5,172,317 | 12/1992 | Asanuma et al. | 364/424.02 |
| 5,220,508 | 1/1993 | Ninomiya et al. | 364/424.02 |
| 5,220,615 | 6/1993 | Ishii et al. | 382/22 |
| 5,247,587 | 9/1993 | Hasegawa et al. | 382/18 |
| 5,745,422 | 9/1993 | Borcherts et al. | 364/424.02 |

FOREIGN PATENT DOCUMENTS 62-70916 1/1987 Japan .
62-24310 2/1987 Japan .

OTHER PUBLICATIONS

Thorpe et al "Vision and Navigation for the Carnegie-Mellon Navlab", IEEE PAMI vol. 10, No. 3, May 1988, pp. 362–373.

Liou et al, *Road Following Using Vanishing Points*, Jul. 1987, Computer Graphics, Vision, and Image Processing, pp. 116–130.

McCash, D. "Smart Highways", Popular Science, vol. 235, No. 5 p. 119, Nov. 1989.

The Journal of the Pattern Recognition Society, Pattern Recognition "Robot Guidance Using Computer Vision" Courtney pp. 585–592.

*Primary Examiner*—Joseph Mancuso
*Assistant Examiner*—David Fox
*Attorney, Agent, or Firm*—Lyon & Lyon

[57] ABSTRACT

A device and a process for judging the contour of a road by processing data from an image taken of the road by a camera. In the data processing, Hough transform is used to obtain a plurality of straight lines approximate to the edges of the road. In order to recognize the contour of a road, it is most important to recognize the edges of the road. For the recognition of a road, for example, an image taken of the road is divided into upper and lower regions. In the lower region, two straight lines are given approximate to the right and the left edges of the road. In the upper region as well, two straight lines are given approximate to the right and the left edges of the road. Then, positional relationships between the intersection of the former two straight lines and that of the latter two straight lines are compared. Based on positional relationships, it can be judged very easily whether the road is straight, curves, inclines or declines.

14 Claims, 19 Drawing Sheets

Fig.7

|  | $P_1$ | $P_2$ | $P_3$ | $P_4$ | $P_5$ | ... | $P_{i-1}$ | $P_i$ | $P_{i+1}$ | ... |
|---|---|---|---|---|---|---|---|---|---|---|
| $\theta_1$ | 0 | 1 | 2 | 0 | 0 | | | | | |
| $\theta_2$ | 1 | 2 | 4 | 1 | 0 | | | | | |
| $\theta_3$ | 4 | 6 | 7 | 2 | 3 | | | | | |
| $\theta_4$ | 1 | 3 | 4 | 4 | 6 | | | | | |
| $\theta_5$ | 2 | 3 | 7 | 5 | 1 | | | | | |
| $\theta_6$ | 1 | 2 | 8 | 6 | 3 | | | | | |
| $\theta_7$ | 0 | 1 | 1 | 2 | 1 | | | | | |
| $\theta_8$ | 0 | 0 | 0 | 1 | 0 | | | | | |
| ⋮ | | | | | | | | | | |
| $\theta_{j-1}$ | | | | | | | $C_{i-1,j-1}$ | $C_{i,j-1}$ | $C_{i+1,j-1}$ | |
| $\theta_j$ | | | | | | | $C_{i-1,j}$ | $C_{i,j}$ | $C_{i+1,j}$ | |
| $\theta_{j+1}$ | | | | | | | $C_{i-1,j+1}$ | $C_{i,j+1}$ | $C_{i+1,j+1}$ | |
| ⋮ | | | | | | | | | | |

F1 (box around $P_2$–$P_4$, $\theta_1$–$\theta_4$)
F2 (box around $P_3$–$P_5$, $\theta_5$–$\theta_7$)

Fig.8

| ORDER(k) | COUNT VALUE | $\rho$ | $\theta$ |
|---|---|---|---|
| 0 | $C_0$ | $\rho_0$ | $\theta_0$ |
| 1 | $C_1$ | $\rho_1$ | $\theta_1$ |
| 2 | $C_2$ | $\rho_2$ | $\theta_2$ |
| 3 | $C_3$ | $\rho_3$ | $\theta_3$ |
| | | | |
| n-2 | $C_{n-2}$ | $\rho_{n-2}$ | $\theta_{n-2}$ |
| n-1 | $C_{n-1}$ | $\rho_{n-1}$ | $\theta_{n-1}$ |

Fig. 10

| COUNT VALUE | ρ (dots) | θ (deg) |
|---|---|---|
| 1000 | 200 | 45 |
| 780 | 240 | 123 |
| 712 | 198 | 47 |
| 640 | 242 | 125 |
| 612 | 204 | 48 |

REPRESENTATIVE VALUES
ρ = 200
θ = 45

REPRESENTATIVE VALUES
ρ = 240
θ = 123

DRIVING WAY JUDGING DEVICE AND METHOD

This is a continuation of co-pending U.S. application Ser. No. 07/912,070, filed on Jul. 8, 1992, abandoned and which is a continuation of co-pending application U.S. Ser. No. 7/413,835, filed on Sep. 28, 1992, abandoned and which designated the U.S.

BACKGROUND OF THE INVENTION

1. Filed of the Invention

This invention relates to a device and a method for judging a driving way, specifically to a driving way judging device and method which judges contours, such as straights, curves, inclines, declines, etc. by image processing.

2. Related Background Art

In order to computer-control the driving of an automobile, it is necessary to recognize in real time the contour of a driving way, such as a road. To this end, it is proposed for example to draw optical or magnetic judging lines on driving ways for an optical sensor or magnetic sensor provided on the automobile to sense the judging lines. But this requires drawing judging lines on driving ways, and the automatic drive control systems for such use are not universal. What is proposed here is taking an image of a driving way by a television camera installed in a vehicle and computer-processing the image data so as to recognize the contour of the driving way in real time. There are various methods for processing the image data. One example of the methods uses Hough transform as described in Japanese Patent Laid-Open Publication No 24310/1987 and Japanese Patent Laid-Open Publication No. 70916/1987. But this method has the following disadvantages. The image data prepared by taking a picture of a driving way includes not only data corresponding to the edges of the driving way but also data of buildings, trees around the driving way and data corresponding to the center line. Accordingly it takes a long data processing time to process the data accurately to distinguish the contour of the driving way. In speeding up the data processing, the computer system has to be complicated and becomes expensive. But what is firstly necessary to perform the automatic drive control of a vehicle is to distinguish the macroscopic contour of a driving way. This macroscopic judgment facilitates microscopic judgment of the contour of the driving way.

On the other hand, in the method described in the above-mentioned references, Hough transform is performed on respective characteristic points on an image taken by the camera to thereby give groups of straight lines corresponding to characteristics of characteristic point distributions. To be specific, the contours of white shoulder lines drawn on the edges of a driving way, the center line at the center thereof, guard rails along the driving way, and buildings along the driving way are given as characteristic points on the image. But the straight line groups include such a large number of straight lines that it is not easy to judge which straight lines correspond to the edges of the driving way. However, it is necessary, especially to the case where this method is adapted to an automobile drive control, to recognize the contour of a driving way in real time. Accordingly straight lines corresponding to the edges of the driving way have to be extracted in a very short period of time. But it has been difficult for the above-described method to perform such extraction.

Although a large number of straight lines are thus obtained, they include a number of straight lines having different attributes, i.e., a number of straight lines having different positions and directions. This makes it difficult to judge a direction of continuous run of the driving way in the image, i.e., to judge the direction of continuous run of the driving way. When an image of the driving way taken by the camera is studied in terms of straight arrangements of characteristic points, the image has regions in which characteristic straight arrangements of characteristic points appear, and in which they do not clearly appear. Generally it is easy in the former region to extract an approximate straight line to an arrangement of characteristic points. In the latter region it is difficult to extract an approximate straight line. But in the above-described prior art method, basically the data in both regions are processed collectively, not separately. Consequently it has been impossible to distinguish the contour of a driving way at high speed and with ease.

A first object of this invention is to provide a device and method for judging the macroscopic contour of a driving way at high speed and with ease.

A second object of this invention is to provide a device and a method for extracting at high speed and with ease a pair of straight lines opposed to each other on the right and left edges of a driving way, based on a number of straight lines obtained by processing image data.

A third object of this invention is to provide a device and a method for accurately judging inclines, declines and curves of a driving way, based on positional relationships between a pair of straight lines corresponding to the edges of the driving way.

SUMMARY OF THE INVENTION

A first driving way judging device according to this invention for judging the contour of a driving way by processing data of an image taken of the driving way comprises straight line extracting means for extracting a first straight line approximate to a characteristic point distribution appearing corresponding to one of the edges of the driving way on the image taken of the driving way; straight line selecting means for selecting a second straight line out of a group of straight lines approximate to a characteristic point distribution appearing corresponding to the other of the edges of the driving way, based on a position of the first straight line on the image and preset width information of the driving way; and judging means for judging the contour of the driving way, based on the first and the second straight lines. This device can extract straight lines corresponding to both edges of a driving way based on preset width information of the driving way. That is, a second straight line corresponding to one of the edges of the driving way can be decided in relationship with a first straight line corresponding to the other of the edges, based on the width information of the driving way.

A second driving way judging device according to this invention comprises image dividing means for dividing the data into at least two regions including a lower region (a first region A1) of the image taken of the driving way and an upper region (a second region A2) thereof; lower straight line extracting means for extracting a first lower straight line (a first straight line $g_1$) approximate to a characteristic point distribution appearing corresponding to one of the edges of the driving way in the lower region; lower straight line selecting means for selecting a second lower straight line (a second straight line $g_2$) out of a group of straight lines approximate to a characteristic point distribution appearing corresponding to the other of the edges of the driving way, based on a position of the first lower straight line and preset width information of the driving way; upper straight line extracting means for extracting a first upper straight line (a third straight line $g_3$) approximate to a characteristic point distribution appearing corresponding to one of the edges of the driving way in the upper region; upper straight line selecting means for selecting a second upper straight line (a fourth straight line $g_4$) out of a group of straight lines approximate to a characteristic point distribution appearing corresponding to the other of the edges of the driving way, based on a position of the first upper straight line and preset width information of the driving way; and judging means for judging a contour of the driving way, based on a lower straight line intersection of the first and the second lower straight lines, and an upper straight line intersection of the first and the second upper straight lines. In this device, an image is divided into a first and a second region with respect to straight lines in the respective regions. In the lower region is an image of substantially only a driving way. Accordingly, with no influence of buildings along the driving way in extracting straight lines, the contour of the driving way can be judged accurately and easily.

A first driving way judging process for judging the contour of a driving way by processing data of an image taken of the driving way by a camera comprises a first step of giving straight line groups of a plurality of straight lines corresponding to characteristic point distributions on the image taken of the driving way; a second step of computing a position of a horizon on the image, based on preset position information of the camera; a third step of extracting out of the straight line group a first straight line approximate to the one of the characteristic point distributions appearing corresponding to one of the edges of the driving way on the image; a fourth step of extracting a second straight line approximate to the one of the characteristic point distributions appearing corresponding to one of the edges of the driving way on the image out of those of the groups of straight lines passing near an intersection of a position of the horizon and the first straight line and spaced from the first straight line by a distance corresponding to preset width information of the driving way; and a fifth step of judging a contour of the driving way, based on the first and the second straight lines. In this process, out of a number of straight lines given by the image processing the one corresponding to one of the edges of a driving way is decided, and a straight line corresponding to the other of the edges is predicted based on relationships between the horizon and the width of the driving way (a road). Based on this prediction, a straight line corresponding to the other of the edges is extracted from the straight lines.

A second driving way judging process for judging the contour of a driving way by processing data of an image taken of the driving way comprises a first step of dividing the image taken of the driving way into at least two regions including a first region in which characteristic point distributions on the image appear more characteristically and a second region which is adjacent to the first region in the direction of continuation of the characteristic point distributions; a second step of giving straight line groups of a plurality of straight lines corresponding to the characteristic point distributions on the image; a third step of extracting out of the straight line groups a first straight line approximate to the one of the characteristic point distributions appearing corresponding to one of the edges of the driving way in the first region; a fourth step of extracting a second straight line approximate to the one of the characteristic point distributions appearing corresponding to said one of the edges of the driving way in the second region out of those of the straight line groups passing near an intersection of a boundary between the first and the second regions, and the first straight line; and a fifth step of judging a contour of the driving way, based on the first and the second straight lines. In this process a first straight line is extracted in the region (the first region) where a straight line corresponding to a characteristic point distribution can be easily extracted, and based on the first straight line, a second straight line is extracted in the region (the second region) where a straight line cannot be extracted easily corresponding to a characteristic point distribution. The first and the second straight lines intersect each other near a boundary between the first and the second regions.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 7 is a view explaining filtering used in the method and the device according to the embodiment;

FIG. 8 is a view explaining results of the Hough transform and sorting;

FIG. 10 is a view specifically explaining a result of the clustering;

DESCRIPTION OF THE PREFERRED EMBODIMENT

Figure 1:
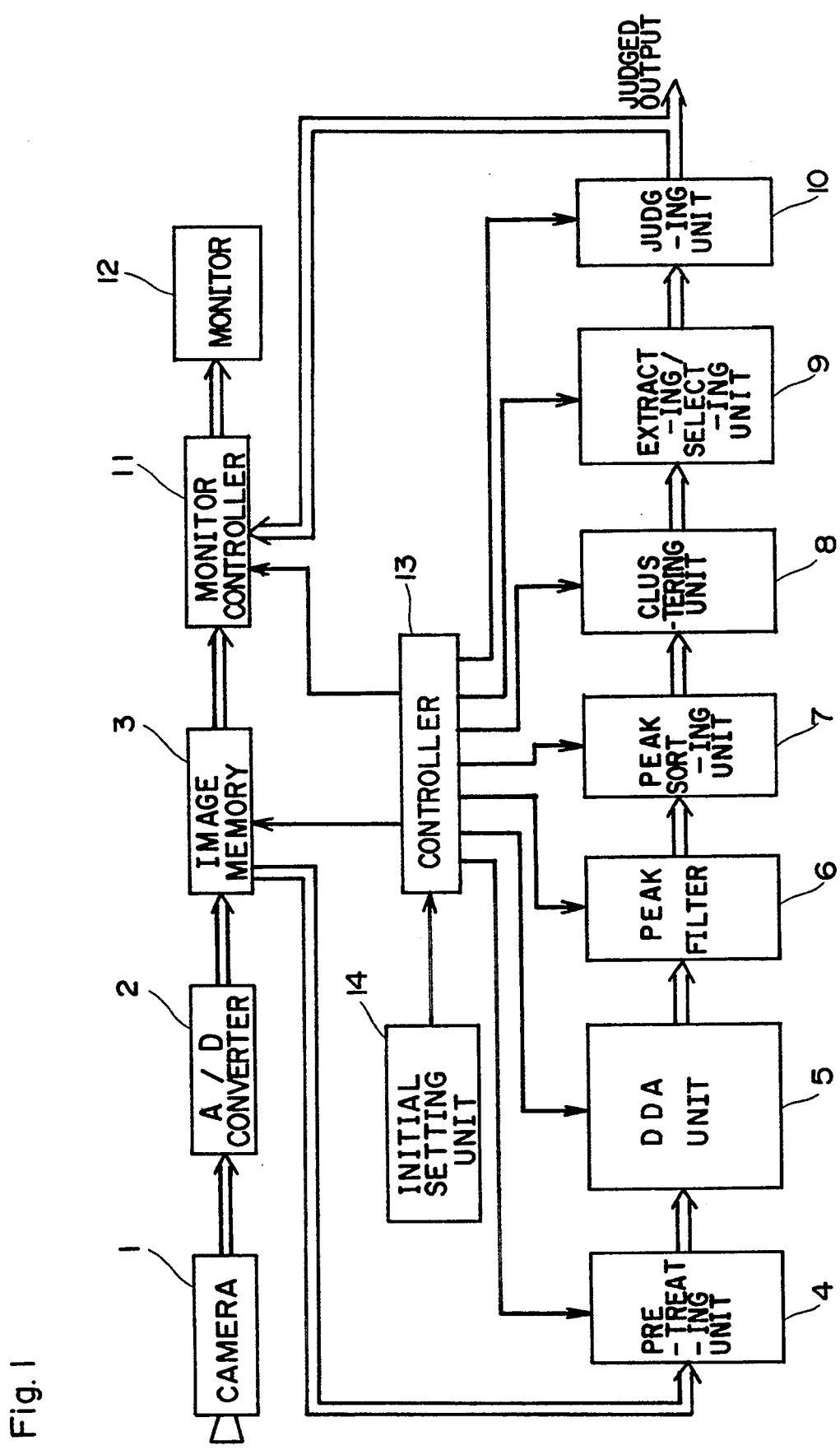
FIG. 1 is a conceptual view of connection relationship of function performing units of the device according to one embodiment of this invention.

As shown in FIG. 1, an analog image data of a driving way taken by a camera 1 mounted on a vehicle is converted into digital data by an A/D converter 2 to be temporarily stored in an image memory 3. Digital image data read from the image memory 3 is supplied to a pretreating unit 4. In the pretreating unit 4, on this digital image data are performed a differentiation for the edge detection, a threshold treatment based on a look-up table (LUT), a setting of regions to be treated, a transformation of coordinate system, etc. A DDA unit 5 performs the so-called digital differential analysis (DDA). Here in the DDA unit 5 Hough transform is conducted in the pipe-line system. This Hough transform gives groups of straight lines corresponding to characteristics of the image.

Data of the straight line groups given by the Hough transform are supplied to a neighboring peak filtering unit 6. In the unit 6, eight-neighboring peak filtering, for example, is performed to select peak data. The selected peak data are supplied to a peak sorting unit 7 to be arranged in decreasing order of magnitude. Subsequently in a clustering unit 8 a representative value of the peak data is selected. This representative value is supplied to a straight line extracting/selecting unit 9. Data of the extracted/selected straight lines are supplied to a judging unit 10. In the judging unit 10 the contour of the driving way, such as the width, curve, incline, decline, etc., are judged. A judged output is supplied to an outside device(not shown), e.g., an automatic drive controller, while supplied to a monitor control unit 11 to be displayed by a CRT monitor 12 in a live image of the driving way and also in line components. The operations of the above-described units is controlled by a controller 13. An initial value setting unit 14 is for setting initial data of the width of a driving way, etc.

The operation of the device according to the above-described embodiment will be explained below.

Figure 2:
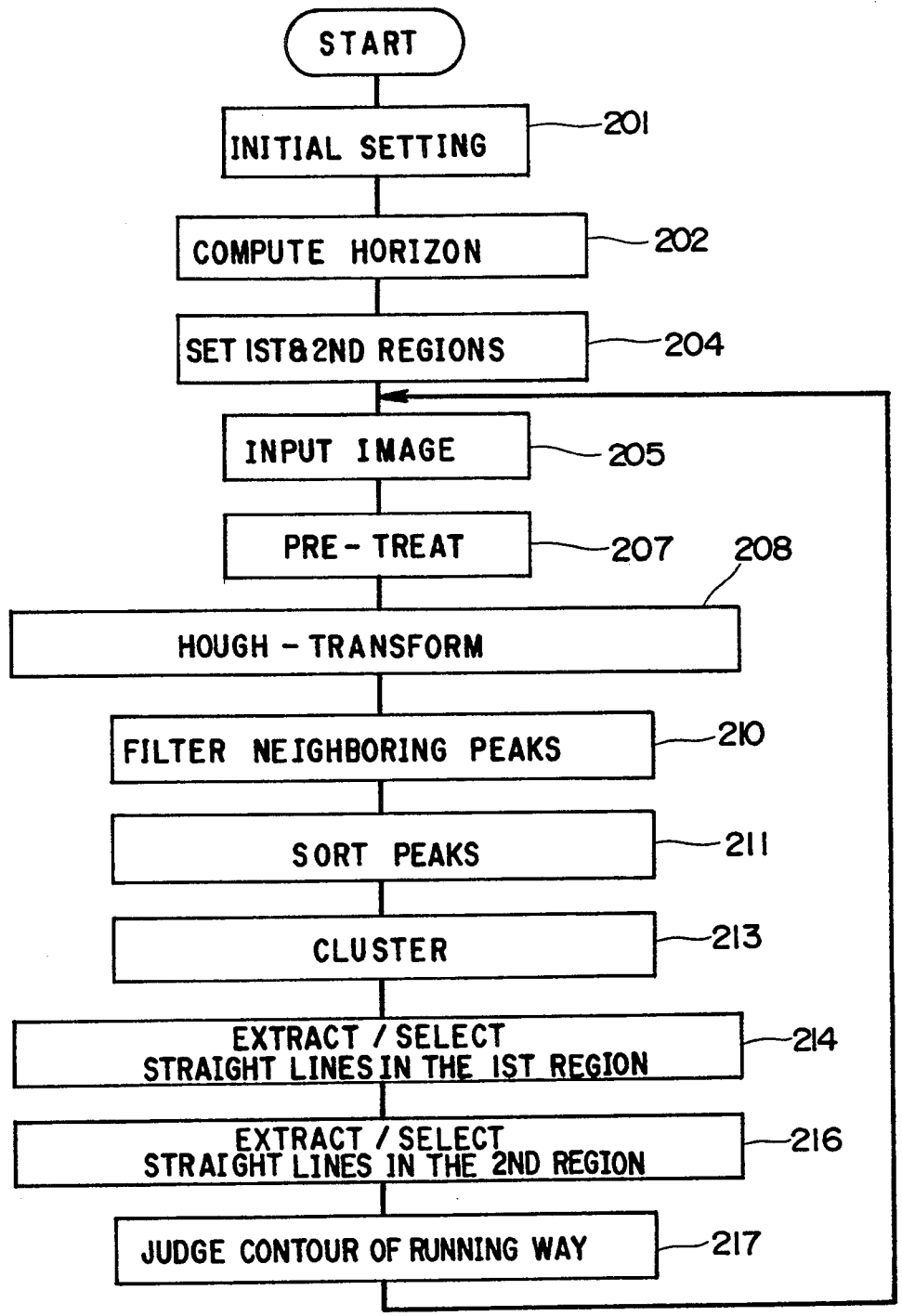
FIG. 2 is a flow chart of the general processing of the driving way judging method according to one embodiment of this invention.

The flow chart of FIG. 2 shows the general procedure of a processing operation. When a processing operation is started, an initial setting is performed (Step 201). In this initial setting step, a driving way width WR, an elevation angle $\theta_0$, a focal length f of the lens of the camera 1, a height $H_c$ of the position of the camera 1 are set. This procedure will be explained with reference to FIGS. 3 and 4.

Figure 3A:
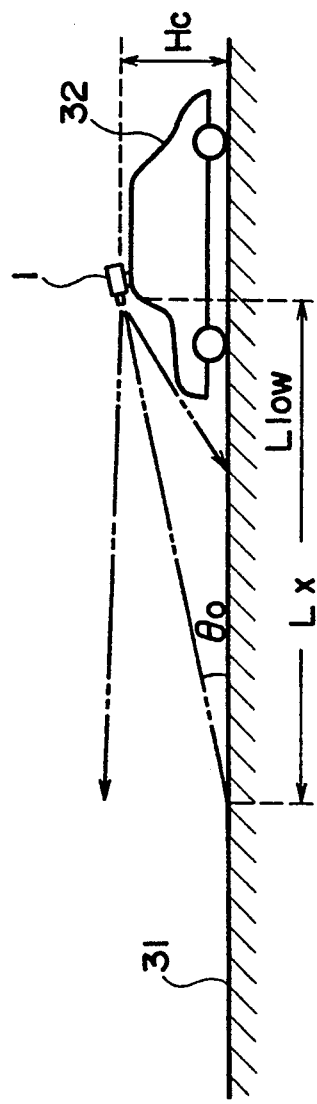
FIGS. 3(a) and (b) are views explaining positions where a camera is mounted on an automobile.
Figure 3B:
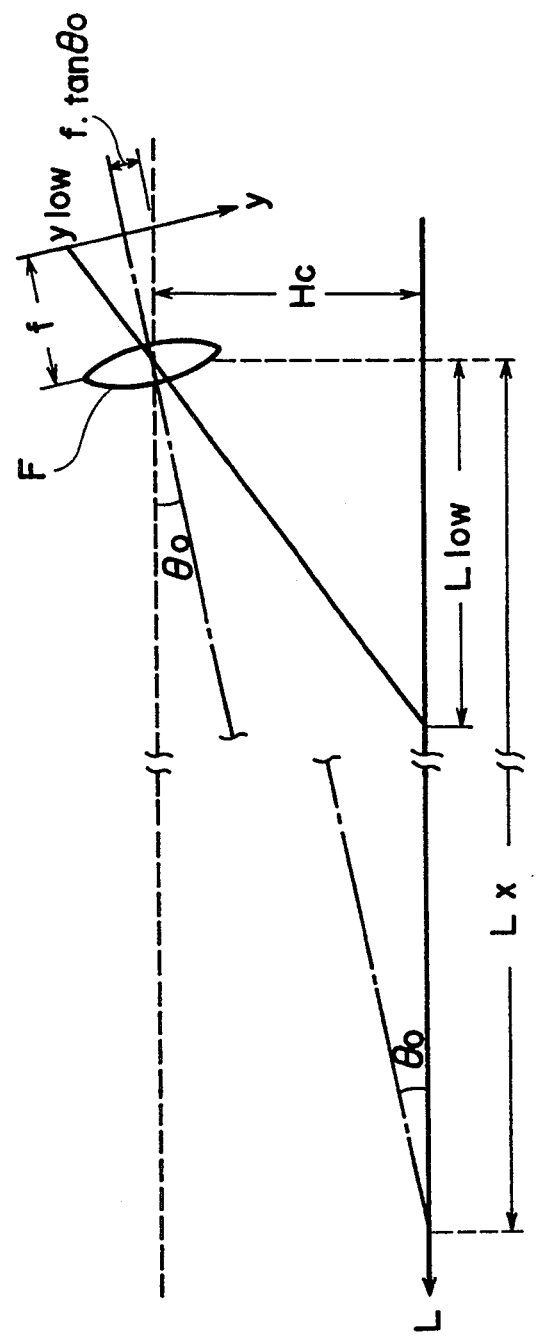
Figure 4C:
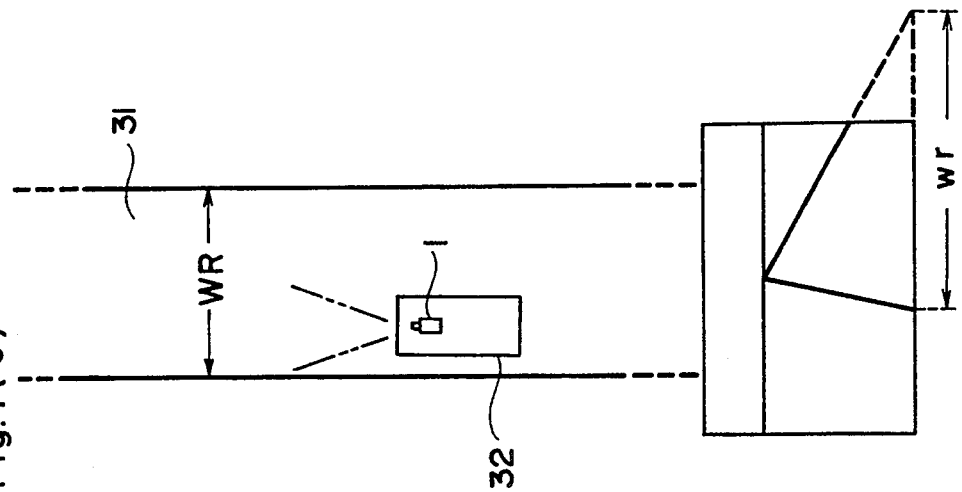
FIGS. 4(a)-(c) are views explaining relationships of locations of the automobile on a driving way and images taken by the camera.
Figure 4B:
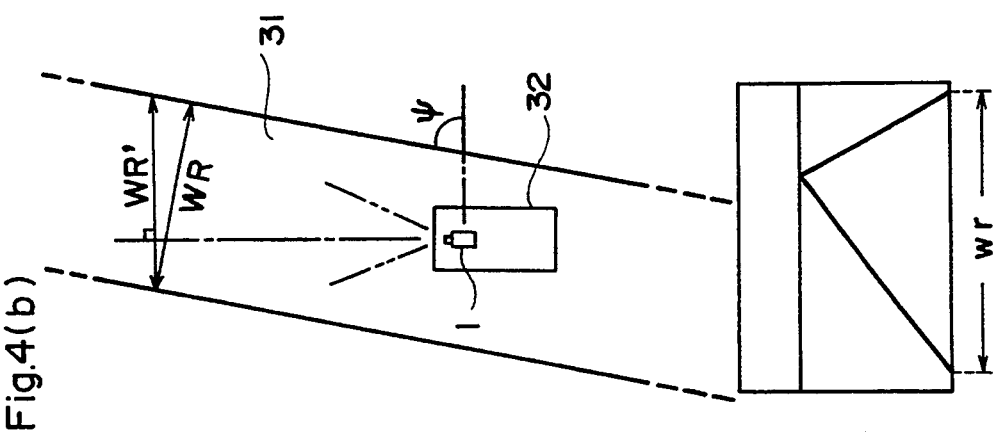
Figure 4A:
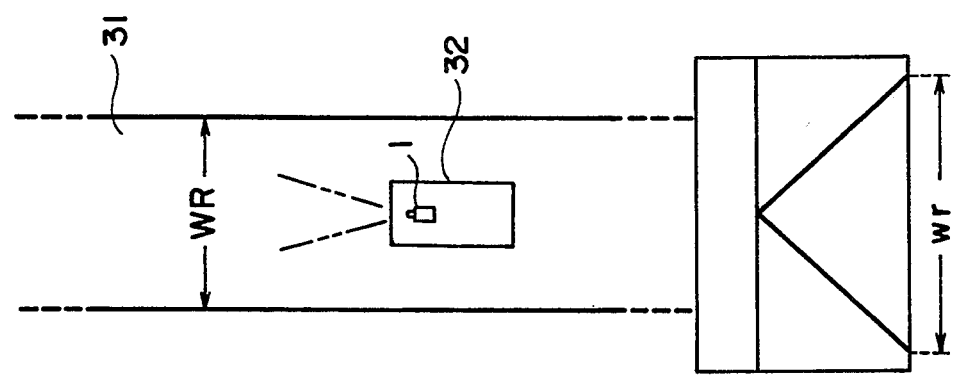

Assuming that, as shown in FIG. 3(a), a vehicle 32 is driving on a driving way 31 with the camera 1 secured to the vehicle 32, an elevation angle $\theta_0$ of the camera 1, and a height $H_c$ of a position of the camera can be set as known values, based on the structure of the vehicle 1. A focal length f can be set as a known value, based on the structure of the camera 1. FIG. 3(b) is an enlarged view of the positional relationship of the optical system of FIG. 3(a). A driving way width WR is set as shown in FIG. 4. With the above-described data set, a driving way width wr at the lower end of an image can be given. That is, a driving way width wr on the image can be given by $$wr = (WR' \cdot f) / \{(L_{low} + H_c \cdot \tan\theta_0)\cos\theta_0\} \quad (1).$$

A distance $L_{low}$ which can be covered at the lower end of the image is given by $$L_{low} = H_c / \tan(\theta_0 + \tan^{-1}(y_{low}/f)) \quad (2).$$

A driving way width WR' for the case that the direction of the driving way is slant to the camera 1 is given based on an inclination angle $\psi$ by $$WR' = WR/\sin\psi. \quad (3)$$

Subsequently a position of a horizon on the image is computed (Step 202 in FIG. 2). A position $H_0$ of the horizon can be given as shown in FIG. 3(b) by $$H_0 = f \cdot \tan\theta_0. \quad (4)$$

Figure 5:
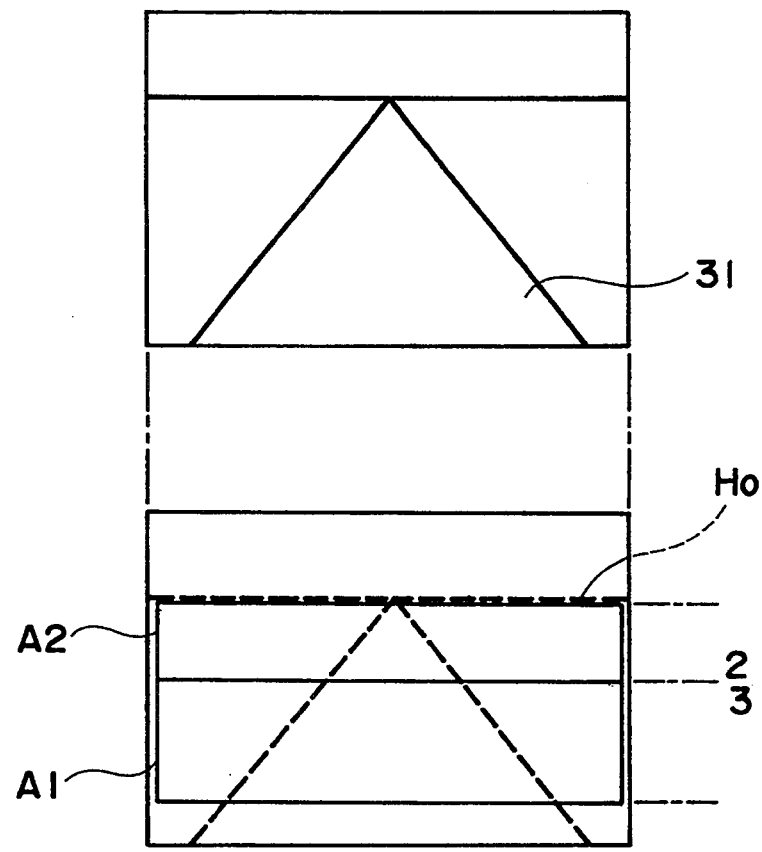
FIG. 5 is a view explaining the setting of a first region A and a second region B in the image.

Then a first region A1 and a second region A2 of the image are set (Step 204 in FIG. 2). That is, as shown in FIG. 5, the first region A1 covers a lower portion of the driving way 31, and the second region A2 covers an upper portion of the driving way 31. The first and the second regions A1, A2 are set in a ratio of 3:2 so that the upper end of the second region A2 substantially agrees with a position $H_0$ of the horizon.

When these preparatory steps are finished, image data are inputted and the processing of the data are repeatedly executed for judgment of the driving way. That is, analog image data is converted into digital data by an A/D converter 2. This digital data is inputted through an image memory 3 in FIG. 1 to a pretreating unit 4 for required pretreatment (Step 207 in FIG. 2). In the pretreating unit 4 the digital data is edge-detected by, e.g., using Sobel. The resultant edge data is Hough transformed by a DDA unit 5 in FIG. 1. The Hough transform is conducted in the pipe-line system by a plurality of serially connected DDA circuits (not shown). The processing of the edge data is briefed in, e.g., U.S. Pat. No. 3,089,854. That is, in an image showing a distribution of edge points, a straight line passing the edge points is imaged, and a perpendicular is drawn to this straight line from a required origin. When a length of the perpendicular is $\rho$, an angle of this perpendicular to the horizontal axis of the coordinate system on the image is $\theta$, and a value of $\theta$ is varied, the straight line group is converted into a sine curve which is called a Hough curve. This sine curve is drawn in the $\rho$-$\theta$ plane. This Hough curve varies depending on an edge point, and edge points aligned on the same straight line on the image has one intersection in the $\rho$-$\theta$ plane. This makes it possible to obtain a position and an inclination of a straight line g approximate to an arrangement of edge points in the $\rho$ and $\theta$ value by checking an overlap of the Hough curves in the $\rho$-$\theta$ plane.

This will be described below with reference to FIG. 6.

Figure 6A:
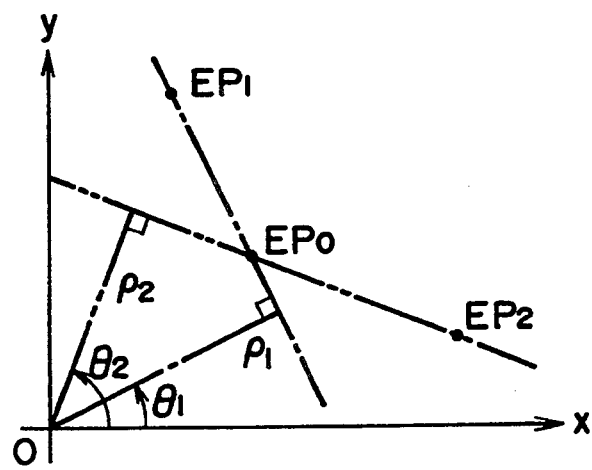
FIGS. 6(a) and (b) are views explaining Hough transform used in the method and device according to the embodiment.
Figure 6B:
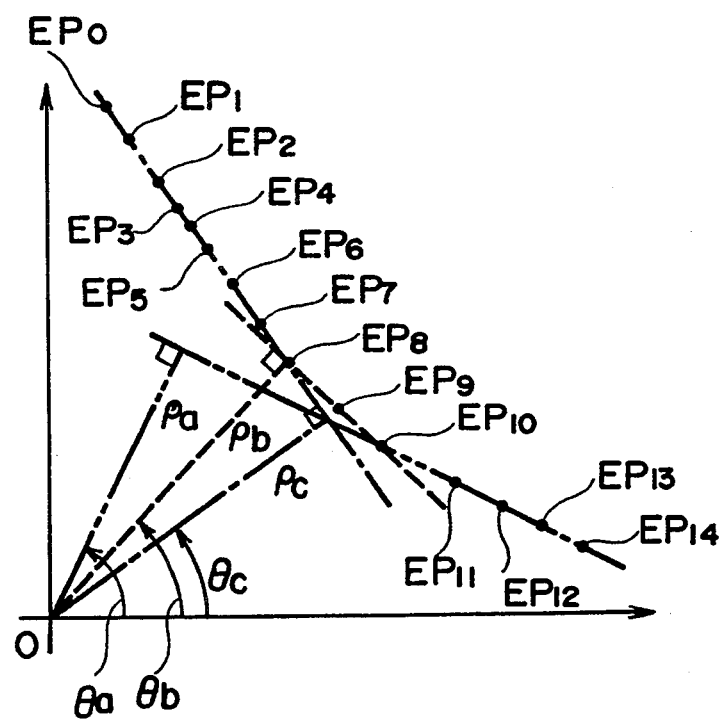
Figure 16A:
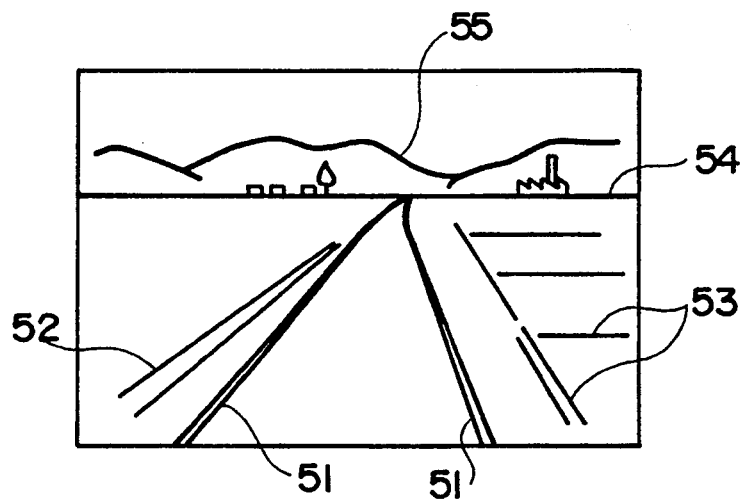
FIGS. 16(a)-(e) are views explaining the steps of selecting, based on a first straight line corresponding to one of the edges of a driving way, a second straight line corresponding to the other of the edge of the driving way.
Figure 16B:
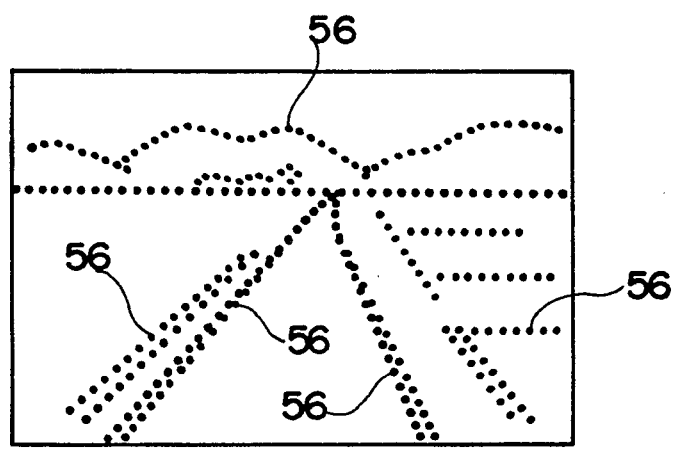

It is assumed that there are three edge points $EP_0$, $EP_1$, $EP_2$ in x-y plane, an image plane, as shown in FIG. 6(a). Then one Hough curve (sine curve) is drawn through each edge point $EP_0$, $EP_1$, $EP_2$ in the x-y plane. Two Hough curves through the edge points $EP_0$, $EP_1$ intersect at coordinates $(\rho_1, \theta^1)$, two Hough curves through $EP_0$, $EP_2$ intersect at coordinates $(\sigma_2, \theta_2)$. Here is assumed that fifteen edge points $EP_0$–$EP_{14}$ are arranged as shown in FIG. 16(b). One Hough curve is drawn through each edge point in the $\sigma$-$\theta$ plane. It is seen that nine Hough curves through the edge points $EP_{10}$–$EP_8$ intersect at coordinates $(\sigma_c, \theta_c)$, the three Hough curves through the edge points $EP_{10}$–$EP_{14}$ at coordinates $(\sigma_b, \theta_b)$, and the five Hough curves $EP_{10}$–$EP_{14}$ intersect at coordinates $(\sigma_a, \theta_a)$.

As seen from the above explanation, a straight line is given, based on the coordinate values $(\sigma, \theta)$ of those of the intersections of the Hough curves where the intersection takes place more frequently, approximately to the arrangement of the edge points. Based on the thus obtained straight line, a characteristic arrangement of data on the image, i.e. a characteristic point distribution can be recognized.

Next, the filtering in Step 210 in FIG. 2 will be explained below with reference to FIG. 7.

FIG. 7 shows count values in the $\sigma$-$\theta$ coordinate system, i.e., overlaps of Hough curves corresponding to respective edge points. The eight-neighboring peak filtering is conducted by comparing a count value $C_{i,j}$ at coordinates $(\sigma_i, \theta_j)$ with the count values at eight coordinates neighboring the coordinates $(\sigma_i, \theta_j)$. That is, when the count value $C_{i,j}$ are larger than count values $C_{i-1,j-1}$–$C_{i+1,j+1}$ at coordinates $(\sigma_{i-j}, \theta_{j-1})$ - $(\sigma_{i+j}, \theta_{j+1})$, data. Thus, in the area in FIG. 7 indicated by F1, for example, the count values 7 at coordinates $(\sigma_3, \theta_3)$ are extracted as peak data, but in the area indicated by F2 the count value 6 at coordinates $(\sigma_4, \theta_6)$ is not extracted as peak data.

The filtering is followed by the sorting. In the sorting, peak data based on $\sigma, \theta$ coordinate values and count values described above are rearranged in the decreasing order of the count values C. The sorting is conducted by a software or by an exclusive hardware.

This sorting is followed by clustering in which representative values are selected (Step 213 in FIG. 2).

Figure 9:
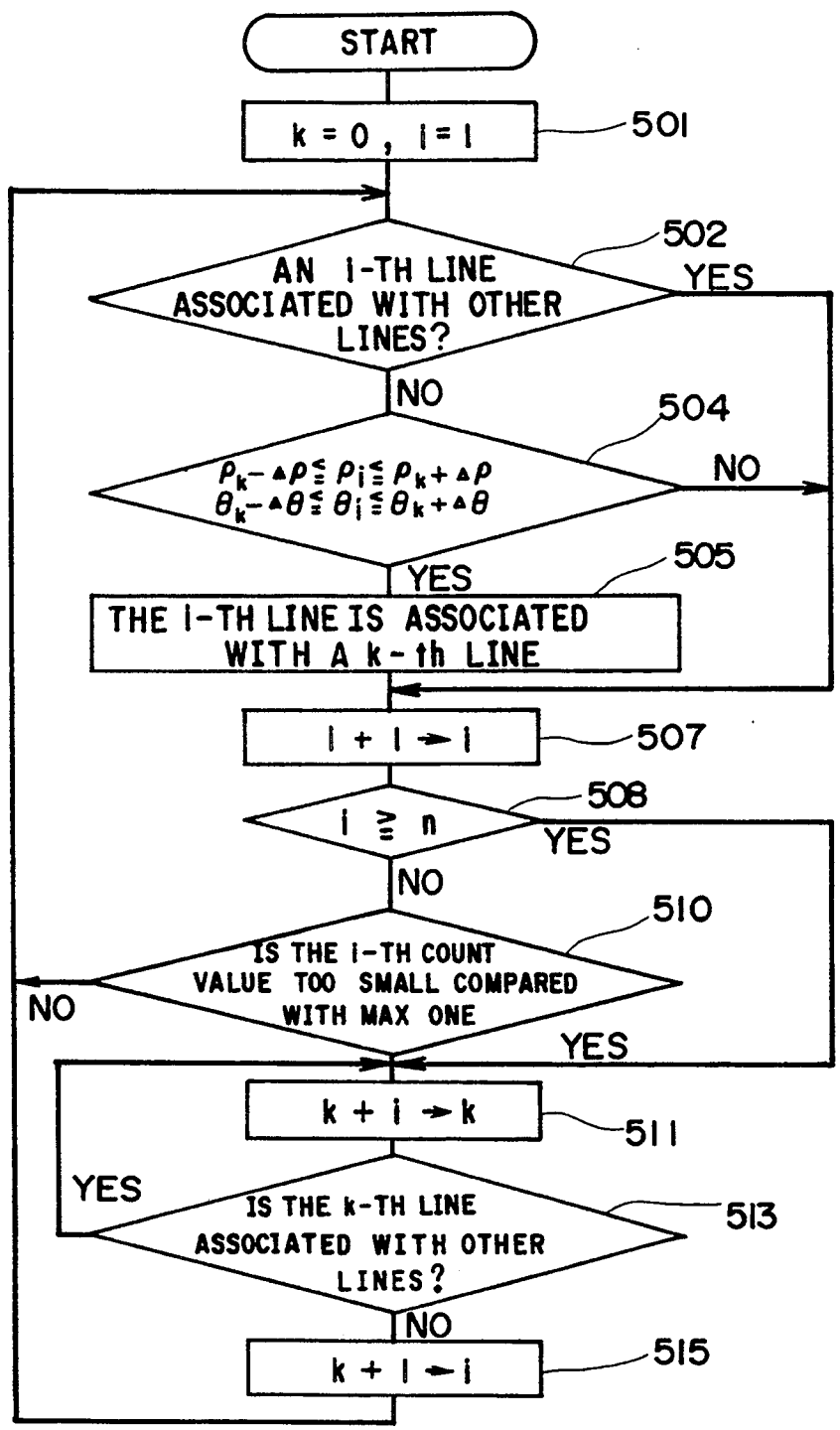
FIG. 9 is a flow chart explaining the steps of clustering.

FIG. 8 shows an example of sorted peak data. In FIG. 8, the count values $C_0, C_1, C_2, \ldots, C_{n-1}$ have been arranged by the sorting in the order of $C_0 > C_1 > C_2 > \ldots > C_{n-1}$. In the clustering, as shown by the flow chart of FIG. 9, firstly $k=0$, and $i=1$ are set (Step 501). Then the processings of Steps 502–515 are repeated. The clustering will be generally explained with k and i set as above. First, it is checked whether an i-th straight line with i>k has already been associated with other straight lines (Step 502). When not, it is checked whether coordinate values $\sigma$, $\theta$ have the relationships $$\sigma_k - \Delta\sigma \leq \sigma_i \leq \sigma_k + \Delta\sigma$$

$$\theta_k - \Delta\theta \leq \theta_i \leq \theta_k + \Delta\theta$$

(Step 504). Only when the above-described relationships hold, the i-th straight line is recognized as associated with a k-th straight line (Step 505). Next, 1 is added to i (Step 507), and only when data is present (Step 508), it is checked whether the i-th count value $C_i$ is too small compared with a maximum count value $C_O$ (Step 510).

This comparison is based on the fact that a too small count value does not much need the data processing.

When the count value $C_i$ is not too small, the processing returns again to Step 502. When the count value $C_i$ is too small, 1 is added to k (Step 511), and another clustering processing is started in Step 513. That is, it is checked whether the k-th straight line has been already associated with other straight lines (Step 513). When it is, 1 is added to k in Step 511, and Step 513 is again executed. When the k-th straight line has not been associated with other straight lines, an i-th next to the k-th ($=k+1$) straight line (Step 515) is processed again by Step 502.

FIG. 10 shows a result of the above-described clustering. In FIG. 10, first representative values are $\sigma=200$ [dots], $\theta=45$ [deg.] at a count value of 1000. Second representative values are $\sigma=240$ [dots], $\theta=123$ [deg.] at a count value of 780.

Figure 11:
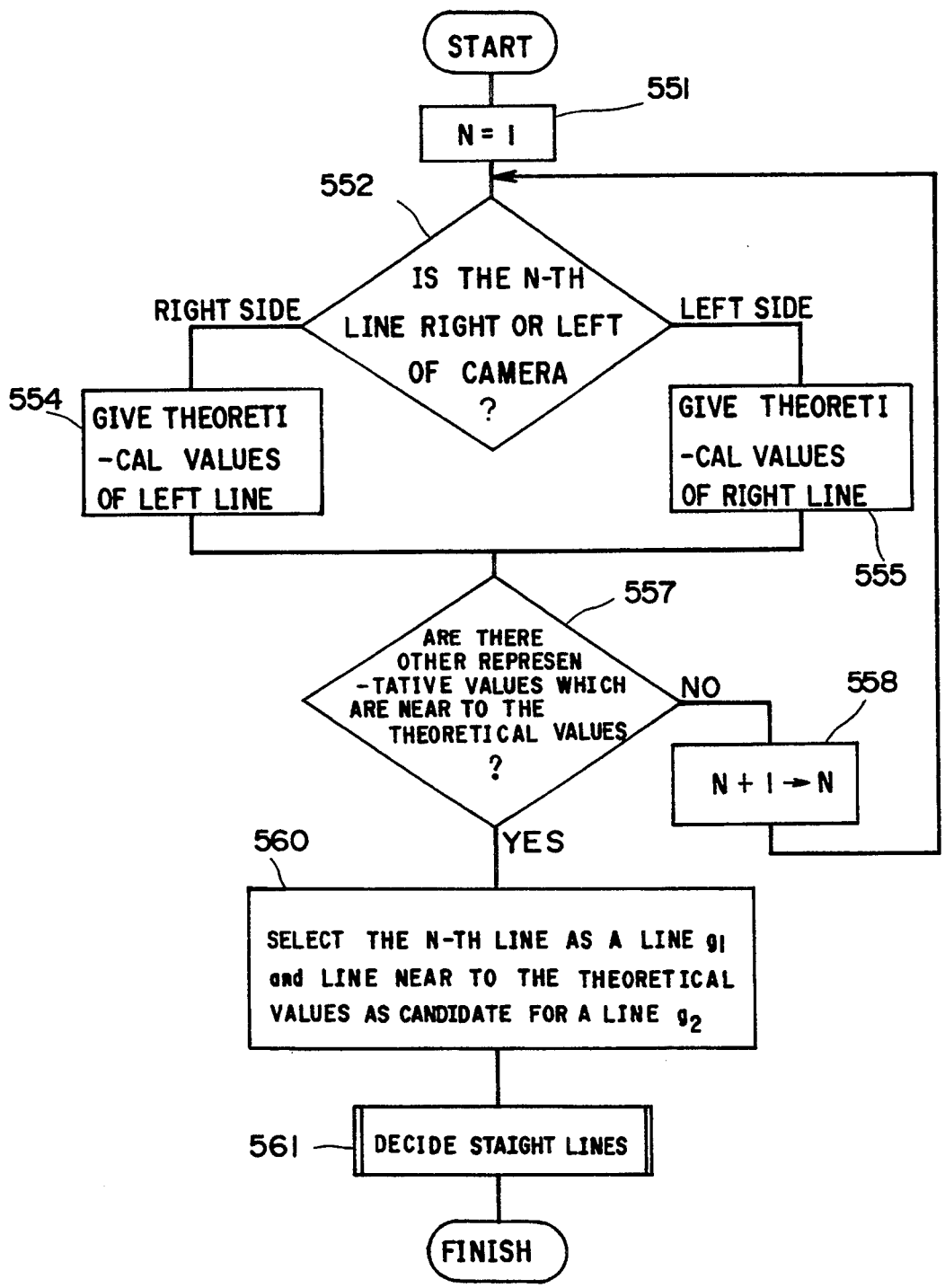
FIG. 11 is a flow chart of extraction and selection of straight lines in a first region A1 of an image.
Figure 12:
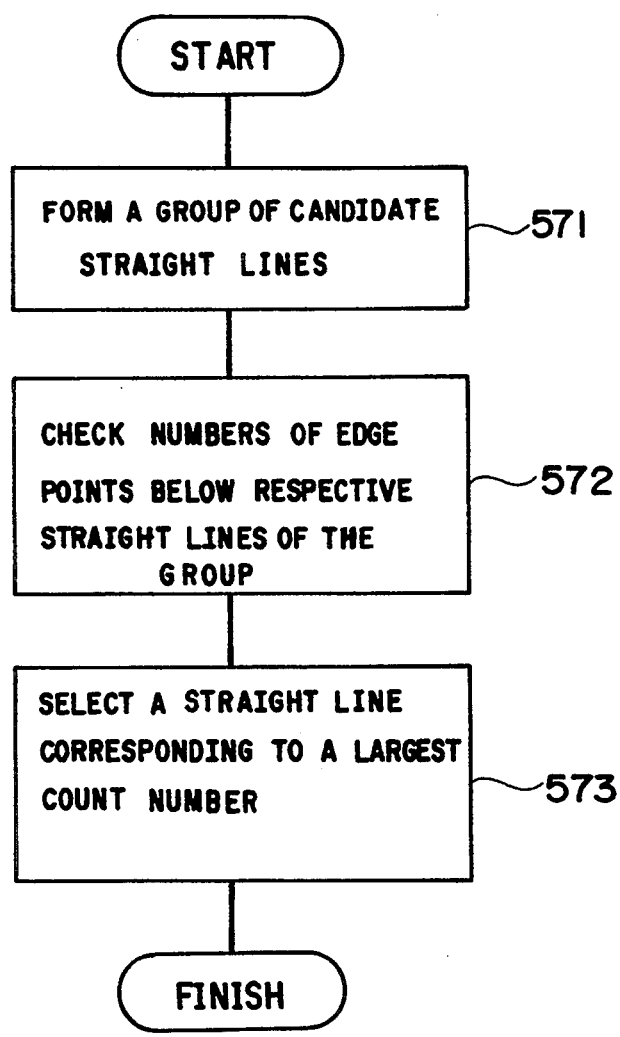
FIG. 12 is a flow chart of selecting a straight line.
Figure 13:
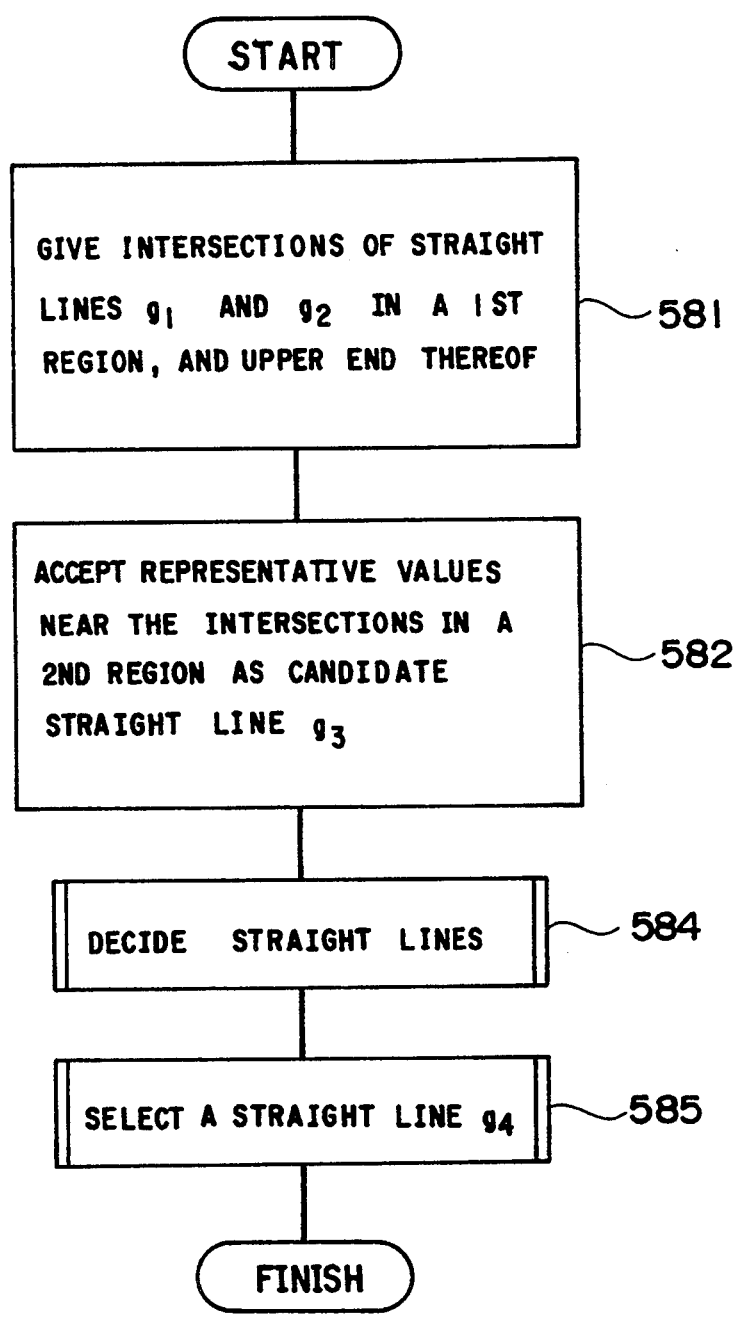
FIG. 13 is a flow chart of extraction and selecting of straight lines in a second region A2 of an image.

This processing is followed by extraction of straight lines in the first region A1 of Step 214 in FIG. 2. FIGS. 11–13 show the flow chart of the extraction of Step 214. In extracting straight lines in the first region A1, firstly a straight line corresponding to N-th representative values are taken out as a first straight line $g_1$ (Step 551), and it is checked whether this straight line corresponds to the edge of the driving way on the left or the right side with respect to the camera 1 (Step 552). When the straight line is on the right side, a second straight line $g_2$ is supposed to be on the left side, and theoretical values of the second straight line are given (Step 554). When the straight line is on the left side, the second straight line $g_2$ is supposed to be on the right side, and the theoretical values of the second straight line are given (Step 555). The above-described processing is repeated (Step 558) until representative values other than those corresponding to the first straight line $g_1$ which are approximate to the theoretical values are found (Step 557). When a first straight line is represented by $g_1 = (\sigma_1, \theta_1)$, theoretical values $\sigma_{2r}, \theta_{2r}$ of a straight line $g_{2r} = (\sigma_{2r}, \theta_{2r})$ on the right side are given $$\sigma_{2r} = H_0 \cdot \sin\theta_{2r} \theta_{2r} = \tan^{-1}\{[(\sigma_1/\cos\theta_1) + wr)]\}/H_0\} \quad (5).$$

On the other hand, theoretical values $\sigma_{2l}, \theta_{2l}$ of a straight line $g_{21} = (\sigma_{21}, \theta_{21})$ on the left side are given by $$\sigma_{2l} = H_0 \cdot \sin\theta_{2l}$$

$$\theta_{2l} = \tan^{-1}\{[(\sigma_1/\cos\theta_1) - wr]/H_0\}. \quad (6)$$

Figure 14:
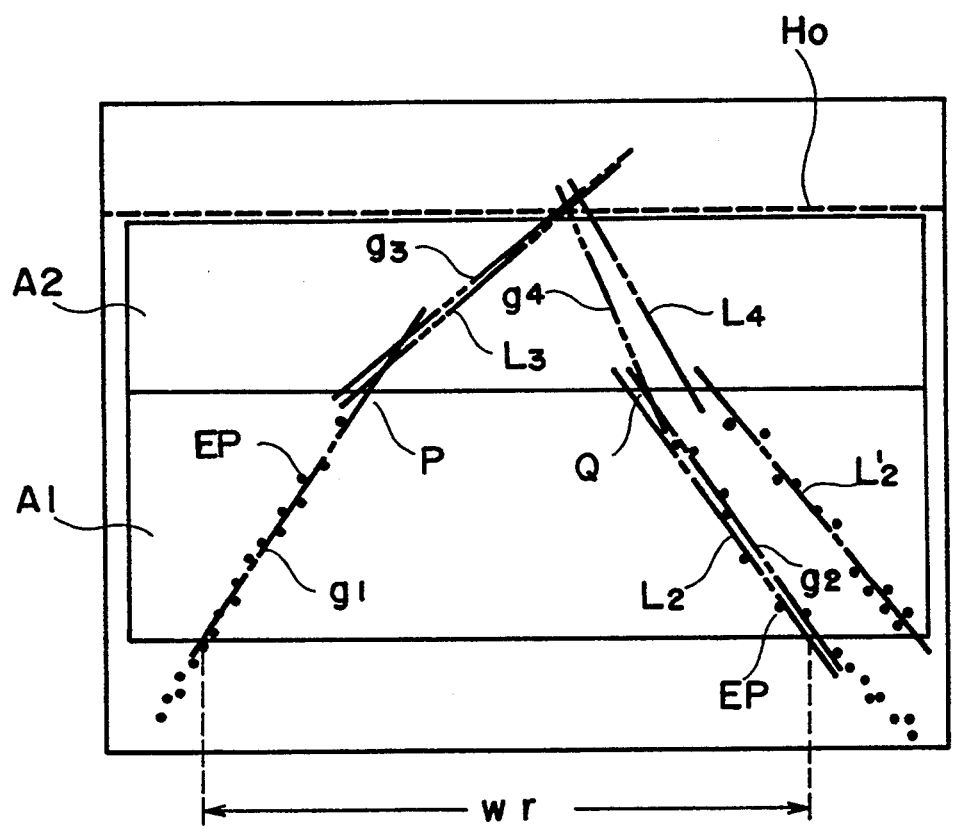
FIG. 14 is a view explaining the extraction and selection of straight lines g₁-g₄ corresponding to the edges of a driving way in an image.

Here, when it is assumed that the first straight line $g_1$ is as shown in FIG. 14, the theoretical values are given based on the relationship between a width wr of the driving way and a position $H_0$ of the horizon in the image. Further when it is assumed that a straight line of the representative values corresponding to the thus given theoretical values is the straight line $L_2$ in FIG. 14 as a result of the processing of Step 560, an operation is performed for deciding the straight line $L_2$ as a candidate straight line for the second straight line $g_2$ (Step 561).

The processing of Step 561 is shown by the flow chart of FIG. 12. A group of candidate straight lines for the second straight line $g_2$ is formed (Step 571). The group is formed by, e.g., a method in which collecting those of representative values which are in a required range, a method in which the Hough transform is conducted at smaller angles, and other methods. In any method, in addition to the straight line $L_2$ approximate to theoretical values, a group including the second straight line $g_2$ is formed (see FIG. 14). Next, numbers of edge points EP below respective candidate straight lines are counted (Step 572). A straight line having a largest number of edge points therebelow is accepted as the second straight line $g_2$. Thus, free from the influence of the straight lines $L_2$, $L_2'$ the real straight line $g_2$ can be selected. When the processing on the first region A1 as described above is over, the processing on the second region A2 is started following the steps of the flow chart of FIG. 13.

First, intersections P, Q of the first and the straight lines $g_1$, $g_2$ in the first region A1 with the upper end of the first region A1 (Step 581). Next, a straight line passing near the intersection P is selected as a candidate for a third straight line $g_3$ (Step 582). The processing of the flow chart of FIG. 12 is performed on this candidate straight line for the decision of a straight line (Step 584), which enables the real third straight line $g_3$ to be extracted under no influence of neighboring straight lines, e.g., the straight line $L_3$ in FIG. 14. Then the step of extracting a fourth straight line $g_4$ follows (Step 585). This step is the same as Steps 551–560 in FIG. 11. Finally, the processing of FIG. 12 for deciding a straight line is performed, and the fourth straight line $g_4$ can be extracted with no influence from, e.g., the straight line $L_4$ in FIG. 14.

The above-described processing is followed by judging the contour of the driving way (Step 217 in FIG. 2).

Figures 15A, 15B, 15C, 15D:
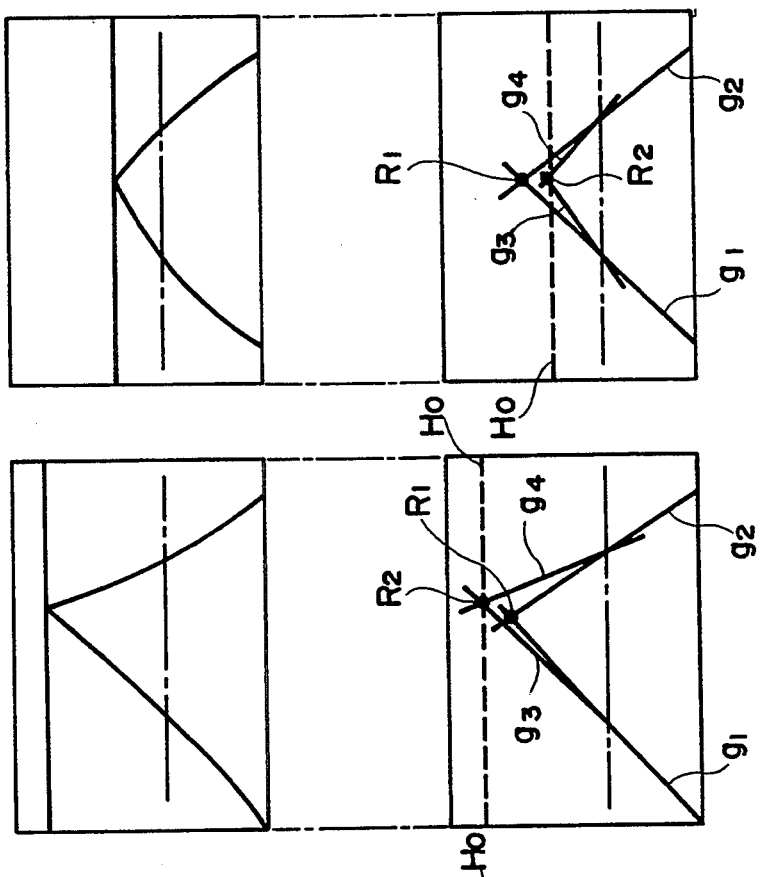
FIGS. 15 (a)-(d) are views explaining judgment of contours of a driving way, such as a straight, right curve, incline and decline.

This judgment is made based on relative positional relationship between the intersection $R_1$ of the first and the second straight lines $g_1$, $g_2$, and the intersection $R_2$ of the third and the fourth straight lines $g_3$, $g_4$ as shown in FIG. 15(a). That is, when the driving way is straight and flat, the coordinates of the intersections $R_1$, $R_2$ substantially agree. In contrast to this, as shown In FIG. 15(b), when the driving way curves right, the intersection $R_2$ appears right of the intersection $R_1$, when the driving way curves left, the intersection $R_2$ appears left of the intersection $R_1$. As shown in FIG. 15(c), when the driving way is an upward slope, the intersection $R_2$ appears above the intersection $R_2$. As shown in FIG. 15(d), when the driving way is a downward slope, the intersection $R_2$ appears below the intersection $R_1$. Accordingly, by obtaining coordinates of the intersections $R_1$ and $R_2$, and comparing them, the contour of a driving way can be judged.

Figure 16C:
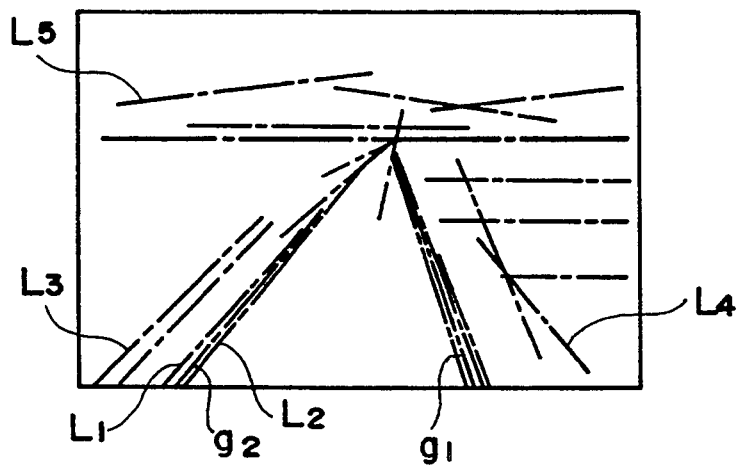
Figure 16D:
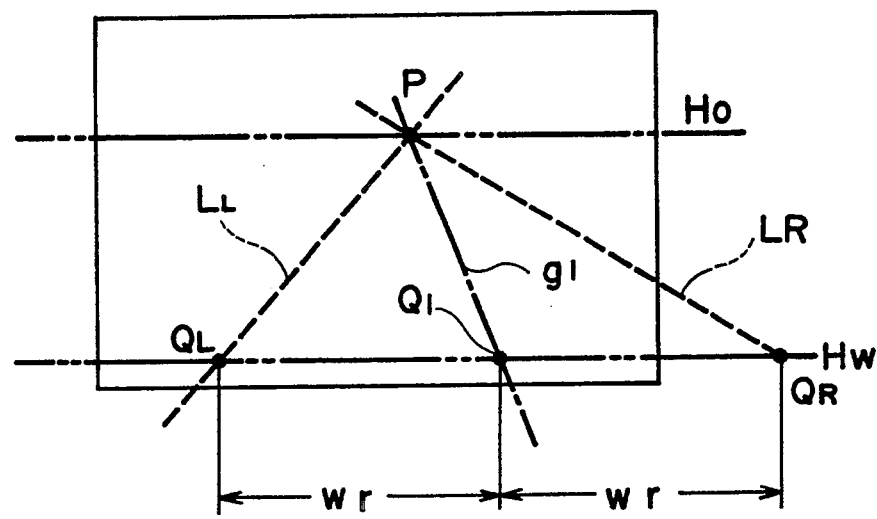

Next, examples of the extraction and selection of a straight line in another embodiment will be explained below with reference to FIGS. 16 and 17. It is assumed that a sight taken by a camera mounted on a vehicle is as shown in FIG. 16(a). In this sight, the driving way has edges 51, 51, a guard rail 52 running along the left edge, footpaths 53 running among paddies, and mountain 54 ranging on the horizon. The image of this sight taken by the camera is differentiated to obtain edged data, and the edged data are shown as dots 56 in, e.g., FIG. 16(b). The Hough transform is conducted on the respective dots 56 and the processings are conducted to extract line components. Then a group of straight lines including straight lines $L_1$–$L_5$, $g_1$, $g_2$ as shown in FIG. 16(c) is given.

From this result of the Hough transform, the filtering, sorting and clustering are conducted, and a straight line approximate to most characteristic arrangement of the image data (dots 56) is given in representative values. When it is assumed that a straight line $g_1$ corresponding to the right edge 51 of the driving way corresponds to maximum representative values, the straight line $g_1$ is drawn as in FIG. 16(d), and the straight line $g_1$ intersects the horizon position $H_0$ and the lower parallel line $H_w$.

Figure 16E:
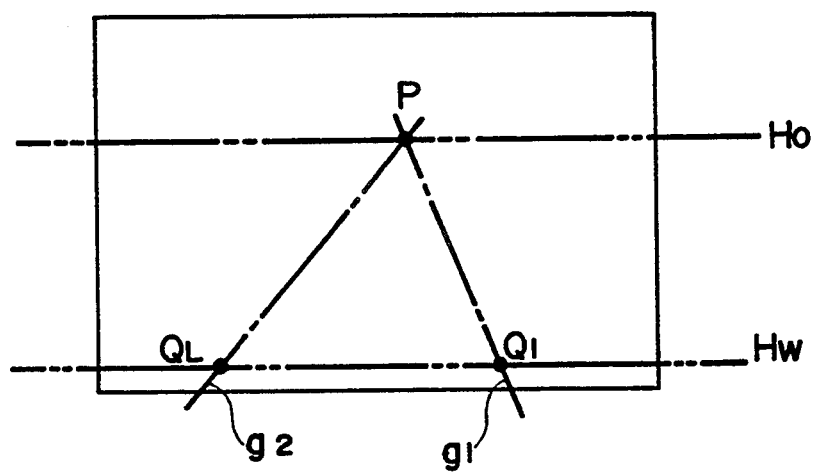

The horizon position $H_0$ can be computed based on camera positional information, such as a position of the camera, inclinations of the camera, etc. A distance between the edges 51, 51 of the driving way at the lower parallel line $H_w$ can be computed based on the camera positional information and driving way information, such as driving way widths. It is theoretically given that the other edge 51 is either of straight lines $L_L$ and $L_R$ in FIG. 16(d). Then the representative values are checked to see whether the left straight line $L_L$ corresponds to the other edge 51, and a second straight line $g_2$ can be given as shown in FIG. 16(e).

FIG. 17 shows another example of the extraction and selection of a straight line in the embodiment. It is assumed that an image taken by the camera is as shown in FIG. 17(a) for example. This sight is processed in the same way as FIGS. 16(a)–(c) to be expressed in dots in FIG. 17(b). By counting intersections of Hough curves, a group of straight lines including straight lines $L_1$–$L_5$ as shown in FIG. 17(c). As seen from FIG. 17(c), characteristics of the straight lines corresponding to the edges 51, 51 of a driving way are comparatively clear at the lower portion of the image, whereas at the upper portion of the image the straight lines corresponding to the edges 51, 51 of the driving way are mixed with straight lines corresponding to the other objects in the sight, and it is difficult to judge characteristics of the straight lines corresponding to the edges 51, 51.

Figure 17A:
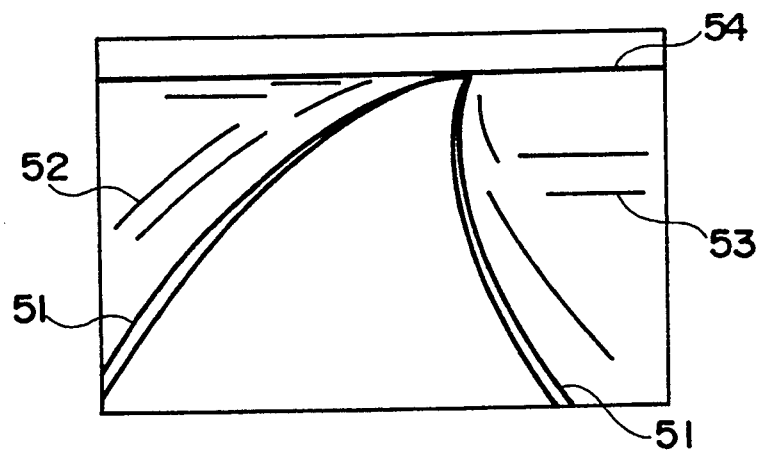
FIGS. 17(a)-(f) are views explaining the steps of extracting and selecting straight lines corresponding to the edges of a driving way with an image divided in a plurality of regions.
Figure 17B:
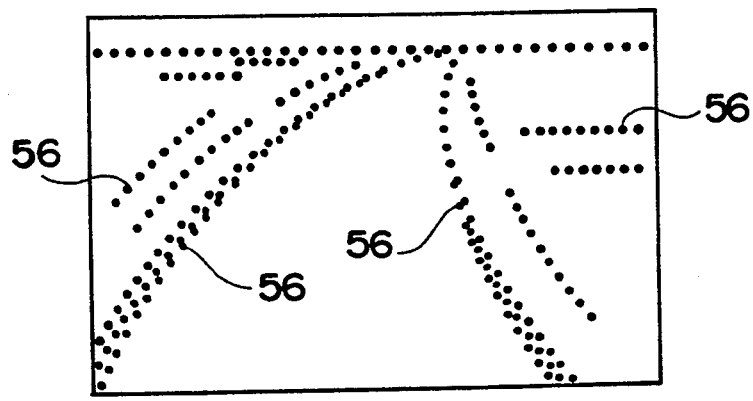
Figure 17C:
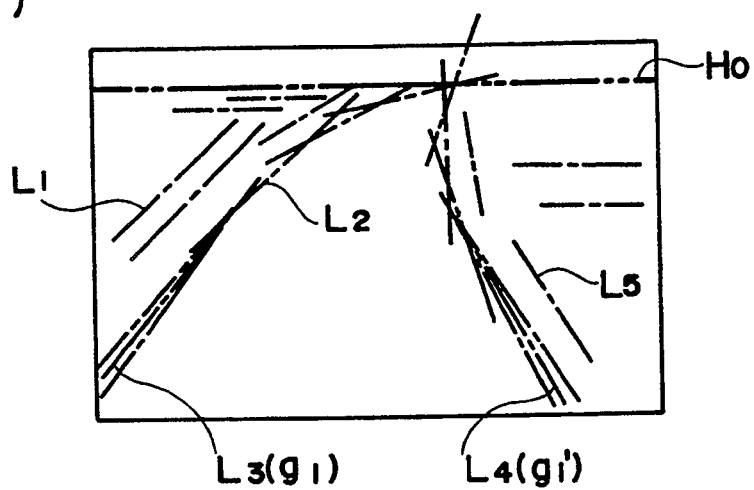
Figure 17D:
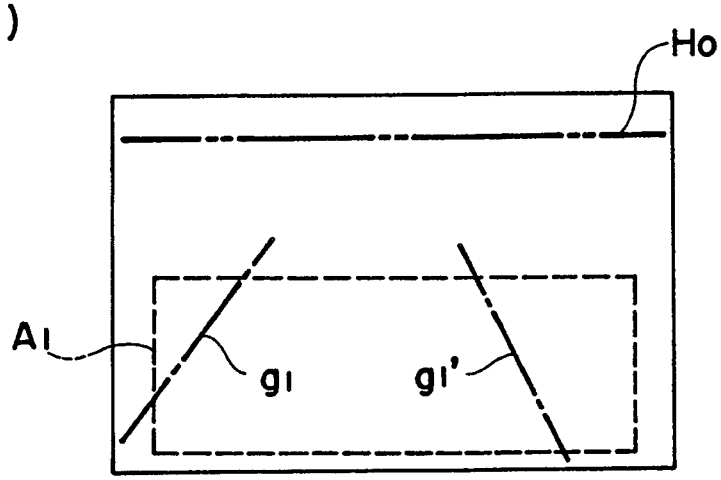

Then as shown in FIG. 17(d), a first region A1 is set on the lower portion of the image where the dots 56 arrange characteristically, and straight lines corresponding to the edges 51, 51 of the driving way are searched. This search may be made by checking representative values. In most cases, straight lines of maximum representative values correspond to the edges 51, 51. Here, if it is assumed that the straight lines $g_1$, $g_1'$ corresponding to the edges 51, 51 correspond to the maximum representative values and a next maximum representative values, these straight lines $g_1$, $g_1'$ can be depicted as shown in FIG. 17(d).

Figure 17E:
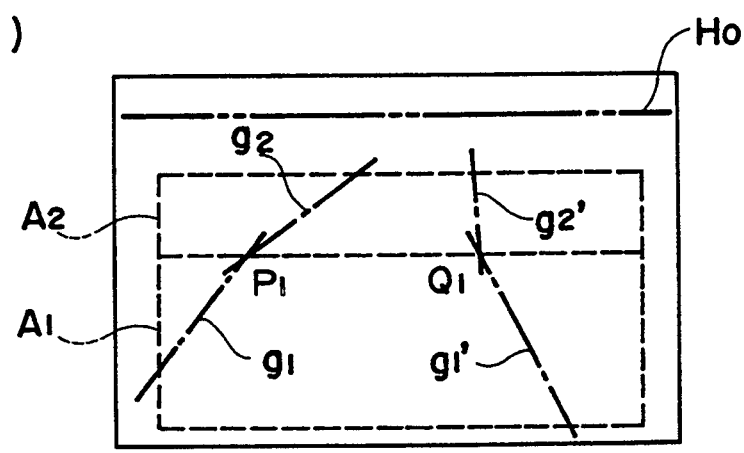

Then a second region A2 which is adjacent to and above the first region A1 is set as shown in FIG. 17(e). The second region is so set that the straight lines $g_1$, $g_1'$ in the first region A1 continue. Straight lines $g_2$, $g_2'$ corresponding to the edges 51, 51 in the second region A2 are extracted. Since intersections $P_1$, $Q_1$ of the straight lines $g_1$, $g_1'$ and $g_2$, $g_2'$ are supposed to be located near the boundary between the first and the second regions A1 and A2 as shown in FIG. 17(e), straight lines $g_2$, $g_2'$ in the second region can be found out of straight lines passing near the intersections $P_1$, $Q_1$. Besides, since an intersection between he straight lines $g_2$, $g_2'$ is supposed to be near to a horizon $H_0$, the straight lines $g_2$, $g_2'$ can be easily extracted.

Figure 17F:
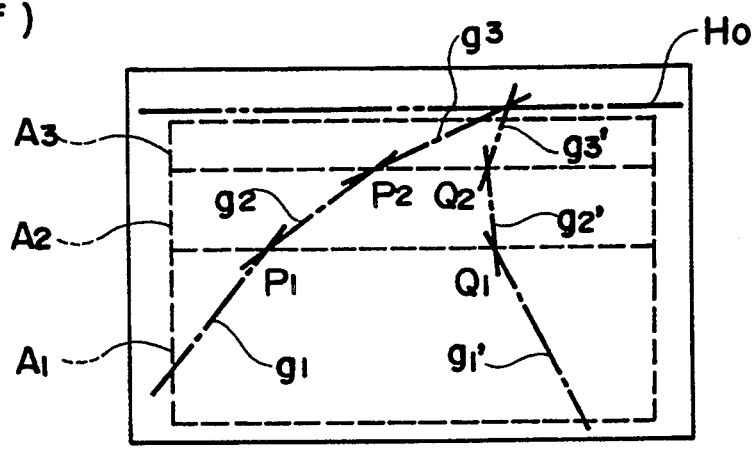

Subsequently, a third region A3 is set adjacent to and above the second region A2 as shown in FIG. 17(f) to find straight lines $g_3$, $g_3'$ corresponding to the edges 51, 51. These straight lines $g_3$, $g_3'$ can be easily obtained in the same way as the straight lines $g_2$, $g_2'$ in the second region A2. In this example, first of all, the processing is performed so as to extract approximate straight lines in a region (the first region A1) where arrangements of image data (dots) are characteristic, and then, based on the processing result, approximate straight lines are given in other regions (the second region A2, and following regions).

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. A driving way judging device for judging a contour of a driving way by processing data of an image taken of the driving way, the device comprising:
    image dividing means for dividing the data into at least two regions including a lower region of the image taken of the driving way and an upper region thereof;
    lower straight line extracting means for extracting a first lower straight line approximate to a characteristic point distribution appearing corresponding to one of the edges of the driving way in the lower region;
    lower straight line selecting means for selecting a second lower straight line out of a group of straight lines approximate to a characteristic point distribution appearing corresponding to the other of the edges of the driving way, based on a position of the first lower straight line and preset width information of the driving way;
    upper straight line extracting means for extracting a first upper straight line approximate to a characteristic point distribution appearing corresponding to one of the edges of the driving way in the upper region;
    upper straight line selecting means for selecting a second upper straight line out of a group of straight lines approximate to a characteristic point distribution appearing corresponding to the other of the edges of the driving way, based on a position of the first upper straight line and preset width information of the driving way; and
    judging means for judging a contour of the driving way, based on a lower straight line intersection of the first and the second lower straight lines, and an upper straight line intersection of the first and the second upper straight lines.

2. A driving way judging device according to claim 1, wherein the judging means judges that the driving way curves right when the upper straight line intersection is right of the lower straight line intersection and that the driving way curves left when the upper straight line intersection is left of the lower straight line intersection.

3. A driving way judging device according to claim 1, wherein the judging means judges that the driving way declines when the upper straight line intersection is below the lower straight line intersection, and that the driving way is inclines when the upper straight line intersection is above the lower straight line intersection.

4. A machine implemented process for analyzing a contour of a driving way by processing data of an image taken of the driving way, the process comprising the steps of:
    dividing the image taken of the driving way into at least two regions including a first region in which characteristic point distributions on the image comprise substantially only data points representative of the driving way and a second region which is adjacent to the first region in the direction of continuation of the characteristic point distributions;
    deriving straight line groups comprising a plurality of straight lines corresponding to the characteristic point distributions on the image;
    extracting a first straight line out of the straight line groups, said first straight line being approximate to the one of the characteristic point distributions appearing corresponding to one of the edges of the driving way in the first region;
    extracting a second straight line approximate to the one of the characteristic point distributions appearing corresponding to said one of the edges of the driving way in the second region out of those of the straight line groups passing near an intersection of a boundary between the first and second regions, and the first straight line; and
    analyzing the contour of the driving way, based on the first and the second straight lines.

5. A machine implemented process for analyzing a contour of a driving way by processing data of an image taken of the driving way, the process comprising the steps of:
    dividing the image taken of the driving way into at least two regions including a first region in which characteristic point distributions comprise substantially only data points representative of the driving way and a second region which is adjacent to the first region in the direction of continuation of the characteristic point distributions;
    deriving straight line groups comprising a plurality of straight lines corresponding to the characteristic point distributions on the image;
    extracting a first pair of straight lines approximate to the ones of the characteristic point distributions appearing corresponding to one and the other of the edges of the driving way in the first region;
    extracting a second pair of straight lines approximate to those of the characteristic point distributions appearing corresponding to said one and the other of the edges of the driving way in the second region out of those of the straight line groups passing near an intersection of a boundary of the first and the second regions and the first pair of straight lines; and
    analyzing the contour of the driving way, based on the first and the second pair of straight lines.

6. A driving way judging process according to claim 5, wherein the third step includes the step of extracting one of the first pair of straight lines approximate to the one of the characteristic point distributions appearing corresponding to one of the edges of the driving way in the first region, and the step of selecting the other of the first pair of straight lines appearing corresponding to the other of the edges of the driving way, based on a position of the first straight line and preset width information of the driving way; and
    the fourth step includes the steps of extracting one of the second pair of straight lines approximate to the one of the characteristic point distributions appearing corresponding to one of the edges of the driving way in the second region out of those of the straight line groups passing near an intersection of a boundary between the first and the second regions, and said one of the first group of straight lines, and selecting the other of the second pair of straight lines appearing corresponding to the other of the edges of the driving way, based on a position of the second straight line and preset width information of the driving way.

7. A machine implemented process for analyzing a contour of a driving way by processing data of an image taken of the driving way, the process comprising the steps of:

dividing the data into at least two regions including a lower region and an upper region of the image taken of the driving way;

extracting a pair of straight lines approximate to characteristic point distributions appearing corresponding to one and the other of the edges of the driving way in the lower region;

extracting a pair of straight lines approximate to those of the characteristic point distributions appearing corresponding to one and the other of the edges of the driving way in the upper region; and analyzing the contour of the driving way, based on a positional relationship between an intersection between the lower pair of straight lines, and an intersection between the upper pair of straight lines.

8. A driving way judging process according to claim 7, wherein the fifth step judges that the driving way curves right when the intersection of the upper straight lines is right of the intersection of the lower straight lines, and judges that the driving way curves left when the former is left of the latter.

9. A driving way judging process according to claim 7, wherein the fifth step judges that the driving way declines when the intersection of the upper straight lines is below the intersection of the lower straight lines, and judges that the driving way inclines when the former is above the latter.

10. In a visual image processing system, a method for performing an analysis of a contour of a road in three dimensions, the road being bounded by a pair of edges, the analysis being based on data contained in a two-dimensional image of the road, and the method comprising the steps of:

dividing the image of the road into two regions, a first and a second region;

deriving a first pair of lines indicative of the edges of the road in the first region;

deriving a second pair of lines indicative of the edges of the road in the second region;

determining a first point of intersection between the first pair of lines indicative of the edges of the road in the first region and a second point of intersection between the second pair of lines indicative of the edges of the road in the second region; and determining the contour of the road based on a spacial relationship between the first and second points of intersection.

11. The method of claim 10 wherein the first region comprises substantially only an image of the road.

12. The method of claim 11 wherein the first pair of lines indicative of the edges of the road in the first region intersect a boundary between the two regions at a pair of boundary intersection points, and the step of deriving a second pair of lines indicative of the edges of the road in the second region further includes the step of selecting candidate line pairs based on the proximity between the candidate line pairs and the boundary intersection points.

13. The method of claim 12 wherein the contour of the road is determined to curve left when the intersection point between the lines of the second region is located to the left of the intersection point between the lines of the first region; determined to curve right when the intersection point between the lines of the second region is located to the right of the intersection point between the lines of the first region; determined to decline when the intersection point between the lines of the second region is located to the below the intersection point between the lines of the first region; and determined to incline when the intersection point between the lines of the second region is located to the above the intersection point between the lines of the first region.

14. A visual image processing system for performing an analysis of a contour of a road bounded by a pair of edges, the system comprising:

means for dividing an image of the road into two regions, a first and a second region;

first line selecting means for deriving a first pair of lines indicative of the edges of the road in the first region;

second line selecting means for deriving a second pair of lines indicative of the edges of the road in the second region;

means for determining a first point of intersection between the first pair of lines indicative of the edges of the road in the first region and a second point of intersection between the second pair of lines indicative of the edges of the road in the second region; and means for determining the contour of the road based on a spacial relationship between the first and second points of intersection.

* * * * *